(12) United States Patent
Durham

(10) Patent No.: US 8,038,871 B1
(45) Date of Patent: Oct. 18, 2011

(54) SEPTIC TANK FLOAT MOUNTING SYSTEM

(76) Inventor: Minous S. Durham, Hartly, DE (US)

( * ) Notice: Subject to any disclaimer, the term of this patent is extended or adjusted under 35 U.S.C. 154(b) by 350 days.

(21) Appl. No.: 12/437,367

(22) Filed: May 7, 2009

(51) Int. Cl.
*F04B 49/04* (2006.01)

(52) U.S. Cl. .................... 210/86; 210/121; 210/532.2

(58) Field of Classification Search ............ 417/36–41, 417/423.3; 73/311, 306, 308; 210/532.2, 210/86, 104, 121, 123; 116/228–229; 340/623–625
See application file for complete search history.

(56) References Cited

U.S. PATENT DOCUMENTS

| | | | |
|---|---|---|---|
| 5,437,424 A | 8/1995 | Netz, Sr. | |
| 6,120,209 A | 9/2000 | Evans | |
| D453,671 S | 2/2002 | Von Fange | |
| 6,551,508 B1 | 4/2003 | Bovington | |
| D522,834 S | 6/2006 | Lalancette et al. | |
| 2006/0192034 A1 | 8/2006 | Gavin | |
| 2006/0201869 A1 | 9/2006 | Collins et al. | |
| 2006/0272203 A1* | 12/2006 | Weber | 47/40.5 |

* cited by examiner

*Primary Examiner* — Terry Cecil

(57) ABSTRACT

A septic tank float mounting system includes a septic tank having a pump therein. A discharge conduit is in fluid communication with the pump. A pump actuating assembly is removably positioned in the septic tank. The pump actuating assembly includes a tube having a first end and a second end. A plurality of clamps is attached to the tube and releasably engages the discharge conduit. A control is positioned outside of the septic tank. An electrical conduit extends through the tube and is in electrical communication with the control and the pump. A float apparatus is releasably engaged to the tube and in communication with the electrical conduit. The float apparatus signals the control to turn on the pump when the float apparatus detects a preselected height of fluid in the septic tank.

4 Claims, 4 Drawing Sheets

SEPTIC TANK FLOAT MOUNTING SYSTEM

BACKGROUND OF THE DISCLOSURE

Field of the Disclosure

The disclosure relates to float mount devices and more particularly pertains to a new easily replaceable float mount device for monitoring fluid levels within a septic tank.

SUMMARY OF THE DISCLOSURE

An embodiment of the disclosure meets the needs presented above by generally comprising a septic tank that has a bottom wall and a perimeter wall that is attached to and extends upwardly from the bottom wall. The perimeter wall has an upper edge defining an opening extending into the septic tank. A pump is positioned in the septic tank. A discharge conduit is in fluid communication with the pump and extends upwardly and outwardly out of the septic tank. The discharge conduit carries material outwardly of the septic tank when the pump is turned on. A pump actuating assembly is removably positioned in the septic tank. The pump actuating assembly includes a tube having a first end and a second end. A plurality of clamps is attached to the tube and releasably engages the discharge conduit. A control is positioned outside of the septic tank. An electrical conduit extends through the tube and is in electrical communication with the control and the pump. A float apparatus is releasably engaged to the tube and in communication with the electrical conduit. The float apparatus signals the control to turn on the pump when the float apparatus detects a preselected height of fluid in the septic tank.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
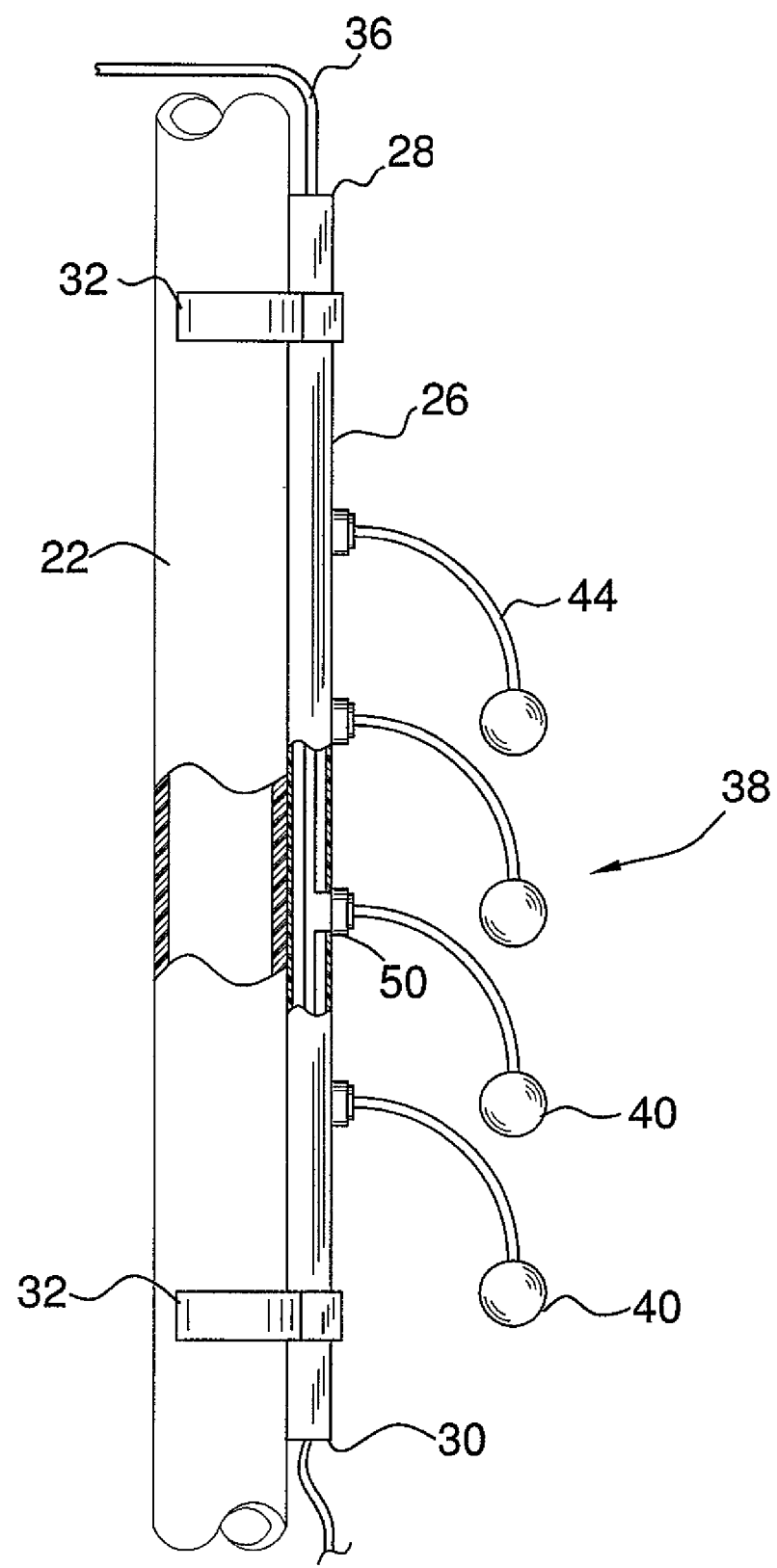
FIG. 1 is a side broken view of a septic tank float mounting system according to an embodiment of the disclosure.
Figure 2:
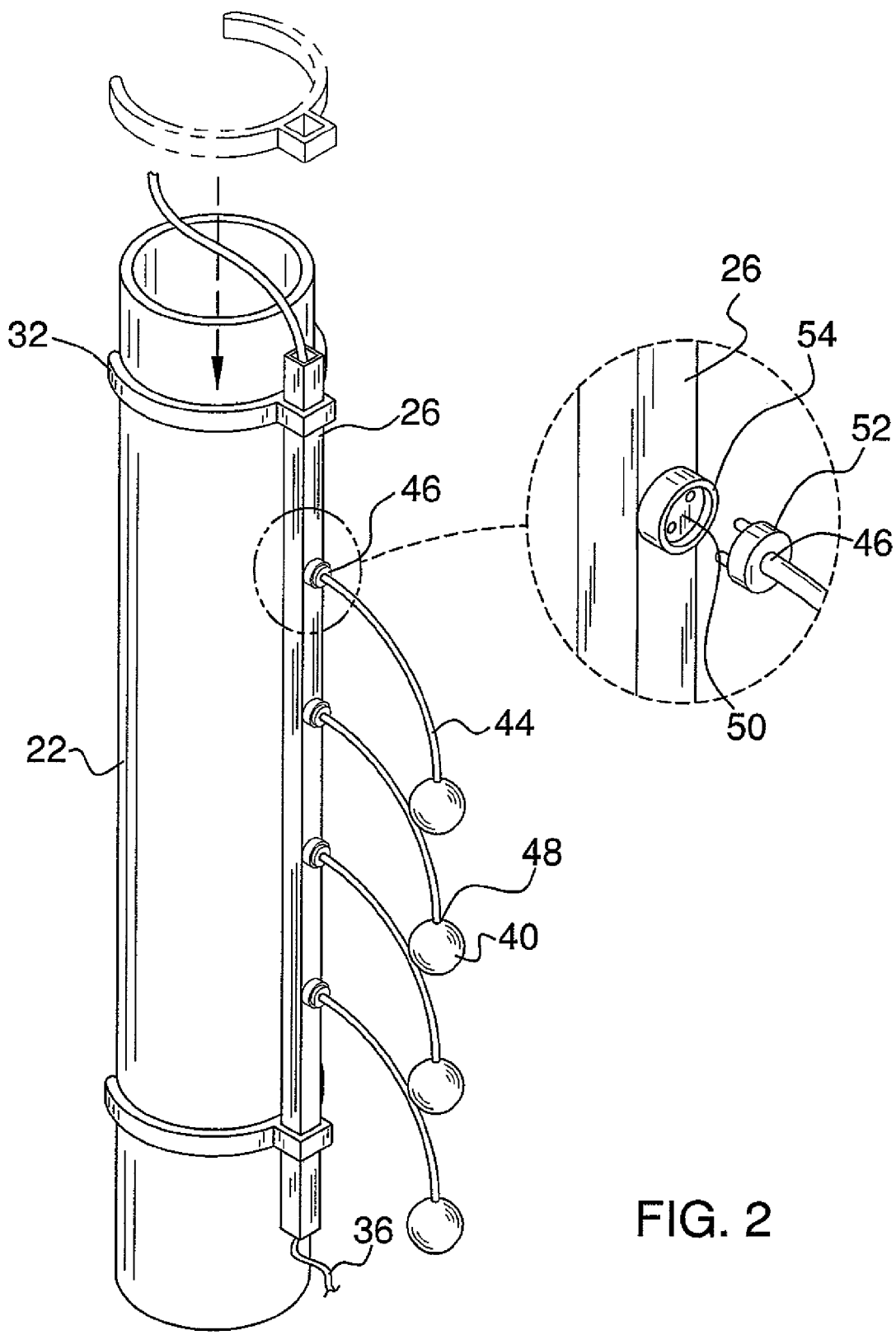
FIG. 2 is a front perspective view of an embodiment of the disclosure.

With reference now to the drawings, and in particular to FIGS. 1 through 4 thereof, a new float mount device embodying the principles and concepts of an embodiment of the disclosure and generally designated by the reference numeral 10 will be described.

As best illustrated in FIGS. 1 through 4, the septic tank float mounting system 10 generally comprises a septic tank 12 that has a bottom wall 14 and a perimeter wall 16 attached to and extends upwardly from the bottom wall 14. The perimeter wall 16 has an upper edge 18 defining an opening extending into the septic tank 12. A pump 20 is positioned in the septic tank 20 and a discharge conduit 22 is in fluid communication with the pump 20. The discharge conduit 22 and extends upwardly and outwardly out of the septic tank 12. The discharge conduit 22 carries material outwardly of the septic tank 12 when the pump 20 is turned on.

A pump actuating assembly 24 is removably positioned in the septic tank 12 to turn the pump 20 on and off as needed. The pump actuating assembly 24 includes a tube 26 that has an upper end 28 and a lower end 30 each being open. A plurality of clamps 32 is provided. Each of the clamps 32 is attached to the tube 26. The clamps 32 releasably engage a vertical section of the discharge conduit 22 to attach the tube 26 to the discharge conduit 22. Though not necessary, the clamps 32 may be C-clamps which do not form a closed loop and which frictionally engaging the discharge conduit 22. This allows for easier mounting and removal of the tube 26. A control 34 is positioned outside of the septic tank 12. An electrical conduit 36 extends through the tube 26 and is in electrical communication with the control 34 and the pump 20.

Figure 3:
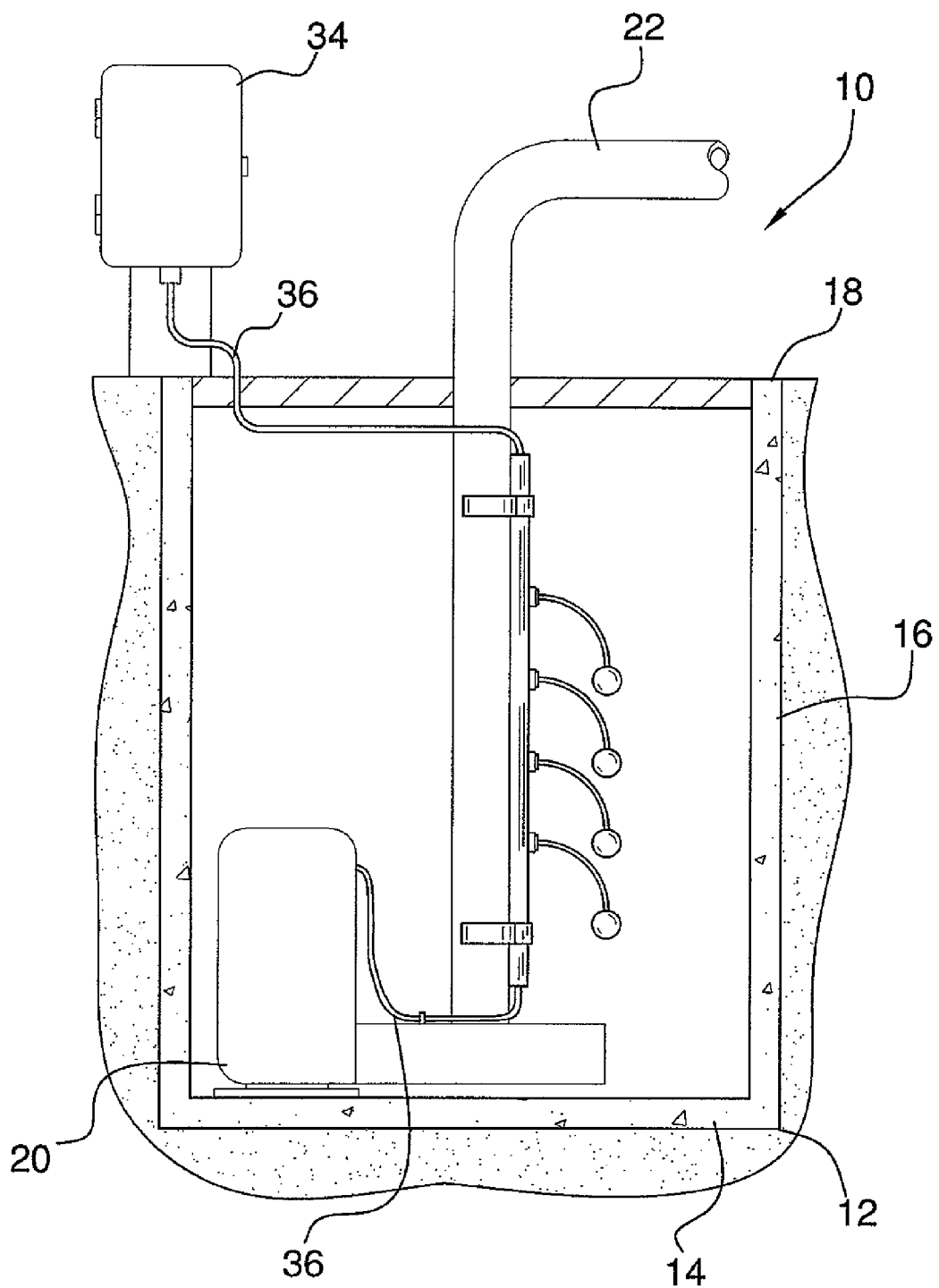
FIG. 3 is a side view of an embodiment of the disclosure.
Figure 4:
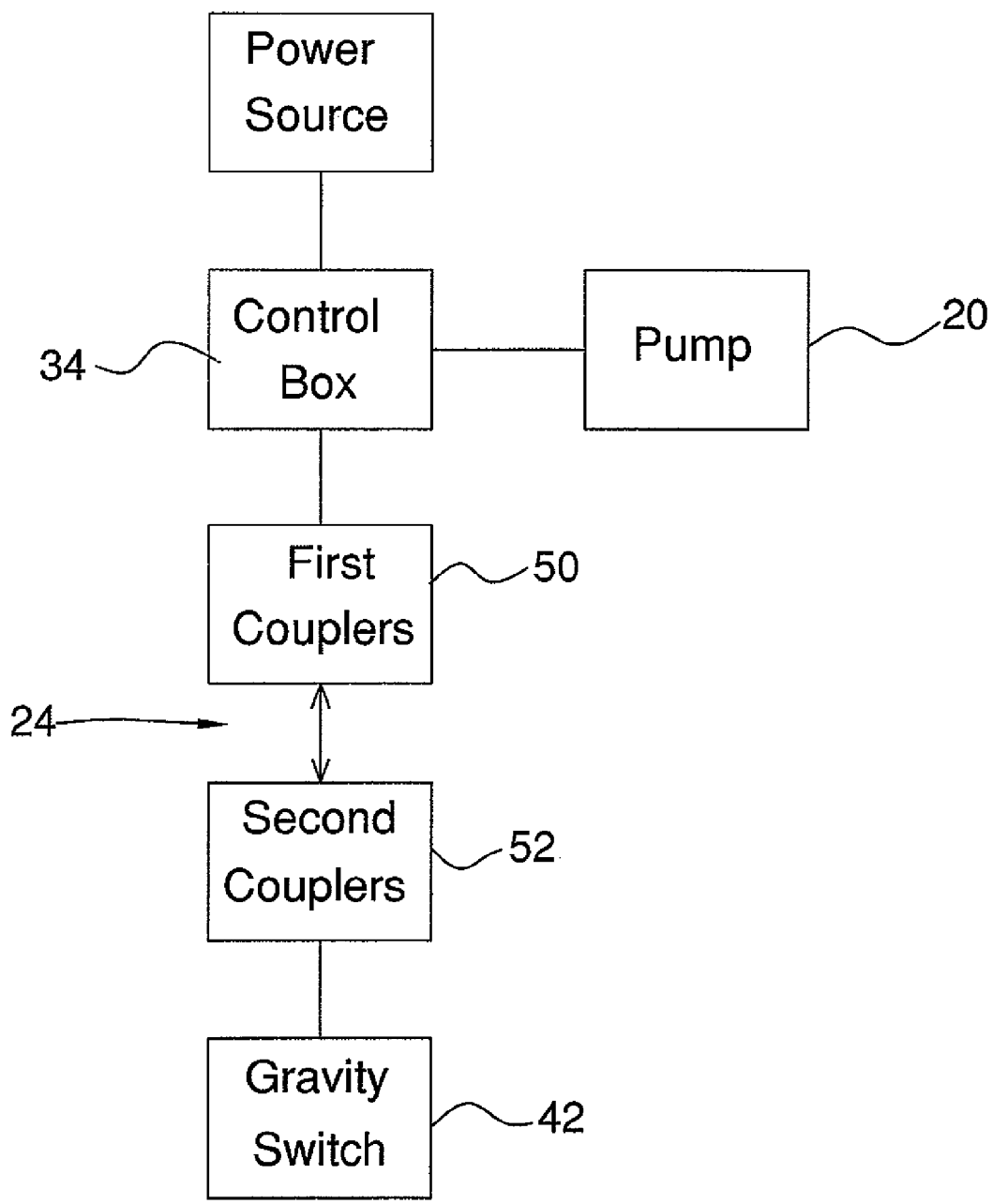
FIG. 4 is a schematic view of an embodiment of the disclosure.

A float apparatus 38 is engaged to the tube 26 and in communication with the electrical conduit 36. The float apparatus 38 signals the control 34 to turn on the pump 20 when the float apparatus 38 detects a preselected height of fluid in the septic tank 12 and turns the pump 20 off when the fluid is below the preselected height. The float apparatus 38 includes a plurality of buoyant members 40 each containing a gravity switch 42. The gravity switch 42 may comprise a mercury switch. A plurality of flexible arms 44 each has a first end 46 and a second end 48. Each of the second ends 48 has one of the buoyant members 40 attached thereto. A plurality of first couplers 50 is mounted on the tube and in electrical communication with the electrical conduit 36. A plurality of second couplers 52 is also provided. Each of the second ends 46 has one the second couplers 52 attached thereto. The second couplers 52 are electrically coupled to an associated one of the gravity switches 42. Each of the second couplers 52 is removably engageable with one of the first couplers 50 to electrically couple the gravity switches 42 to the electrical conduit 36. When the arm 44 is bent downwardly as is shown in FIG. 3, the switch 42 is in an open position. However, when fluid causes the buoyant member 40 to rise, the vertical upward movement causes the switch 42 to be closed which signals the control 34 to turn on the pump 20. The control may include additional actuators for manually turning the pump on or off.

The first couplers 50 each comprise a female plug that includes an outer shroud 54 extending outwardly from a main body of the female plug. The second couplers 52 each comprise a male plug pluggable into the female plug so that the shroud 54 extends completely around a free end of the male plug. A seal is formed between the first 50 and second 52 couplers to prevent fluid from entering the female plug.

In use, the system 10 allows for one or more floats to be used in conjunction with a pump actuating system to provide for fluid level control. When a switch 42 fails, the user of the system 10 can quickly and easily disconnect the first coupler 50 from the second coupler 52 and replace it with a new switch 42. This is much preferable to conventional float systems which require the entire pump motor to be removed to repair the floats.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A float mounting system comprising:
   a septic tank having a bottom wall and a perimeter wall being attached to and extending upwardly from said bottom wall, said perimeter wall having an upper edge defining an opening extending into said septic tank;
   a pump being positioned in said septic tank;
   a discharge conduit being in fluid communication with said pump and extending upwardly and outwardly out of said septic tank, said discharge conduit carrying material outwardly of said septic tank when said pump is turned on;
   a pump actuating assembly being removably positioned in said septic tank, said pump actuating assembly including;
      a tube having an upper end and a lower end;
      a plurality of clamps being attached to said tube, said clamps releasably engaging said discharge conduit;
      a control being positioned outside of said septic tank;
      an electrical conduit extending through said tube and being in electrical communication with said control and said pump; and
      a float apparatus being releasably engaged to said tube and in communication with said electrical conduit, said float apparatus signaling said control to turn on said pump when said float apparatus detects a preselected height of fluid in said septic tank.

2. The system according to claim 1, wherein said clamps are C-clamps not forming a closed loop and frictionally engaging said discharge conduit.

3. The system according to claim 1, wherein:
   said first couplers each comprising a female plug including an outer shroud; and
   said second couplers each comprising a male plug pluggable into said female plug and having said shroud extending completely around a free end of said male plug.

4. A float mounting system comprising:
   a septic tank having a bottom wall and a perimeter wall being attached to and extending upwardly from said bottom wall, said perimeter wall having an upper edge defining an opening extending into said septic tank;
   a pump being positioned in said septic tank;
   a discharge conduit being in fluid communication with said pump and extending upwardly and outwardly out of said septic tank, said discharge conduit carrying material outwardly of said septic tank when said pump is turned on;
   a pump actuating assembly being removably positioned in said septic tank, said pump actuating assembly including;
      a tube having an upper end and a lower end;
      a plurality of clamps, each of said clamps being attached to said tube, said clamps releasably engaging a vertical section of said discharge conduit to attach said tube to said discharge conduit, said clamps being C-clamps not forming a closed loop and frictionally engaging said discharge conduit;
      a control being positioned outside of said septic tank;
      an electrical conduit extending through said tube and being in electrical communication with said control and said pump;
      a float apparatus being engaged to said tube and in communication with said electrical conduit, said float apparatus signaling said control to turn on said pump when said float apparatus detects a preselected height of fluid in said septic tank, said float apparatus including;
         a plurality of buoyant members each containing a gravity switch;
         a plurality of arms each having a first end and a second end, each of said second ends having one of said buoyant members attached thereto;
         a plurality of first couplers mounted on said tube and in electrical communication with said electrical conduit;
         a plurality of second couplers, each of said second ends having one said second couplers attached thereto, said second couplers being electrically coupled to an associated one of said gravity switches, each of said second couplers being removably engageable with one of said first couplers to electrically couple said gravity switches to said electrical conduit;
         said first couplers each comprising a female plug including an outer shroud;
         said second couplers each comprising a male plug pluggable into said female plug and having said shroud extending completely around a free end of said male plug; and
         wherein said pump is turned on when said gravity switch detects vertically upward movement of one or more of said gravity switches.

* * * * *